(12) United States Patent
Lam et al.

(10) Patent No.: US 9,742,183 B1
(45) Date of Patent: Aug. 22, 2017

(54) PROACTIVELY OPERATIONAL OVER-VOLTAGE PROTECTION CIRCUIT

(71) Applicant: Crane Electronics, Inc., Redmond, WA (US)

(72) Inventors: Cuon Lam, Renton, WA (US); Khoa Nguyen, Seattle, WA (US); Hach Nguyen, Lynnwood, WA (US); Peter Odell, Seattle, WA (US); Sovann Song, Bothell, WA (US)

(73) Assignee: Crane Electronics, Inc., Redmond, WA (US)

( * ) Notice: Subject to any disclaimer, the term of this patent is extended or adjusted under 35 U.S.C. 154(b) by 0 days.

(21) Appl. No.: 15/374,116

(22) Filed: Dec. 9, 2016

(51) Int. Cl.
*H02H 7/04* (2006.01)
*H02H 9/04* (2006.01)
(52) U.S. Cl.
CPC ............... *H02H 7/04* (2013.01); *H02H 9/04* (2013.01)
(58) Field of Classification Search
CPC .................................. H02H 7/04; H02H 9/04
USPC ......................................................... 361/56
See application file for complete search history.

(56) References Cited

U.S. PATENT DOCUMENTS

| 3,144,627 A | 8/1964 | Dunnabeck et al. |
| 3,201,728 A | 8/1965 | McWhirter |
| 3,699,424 A | 10/1972 | Hart et al. |
| 3,831,080 A | 8/1974 | Zabert et al. |
| 4,128,868 A | 12/1978 | Gamble |
| 4,255,784 A | 3/1981 | Rosa |
| 4,337,569 A | 7/1982 | Pierce |
| 4,354,162 A | 10/1982 | Wright |
| 4,482,945 A | 11/1984 | Wolf et al. |
| 4,533,986 A | 8/1985 | Jones |

(Continued)

FOREIGN PATENT DOCUMENTS

| CN | 2307390 Y | 2/1999 |
| CN | 101326705 A | 12/2008 |

(Continued)

OTHER PUBLICATIONS

"Application Guide: Theory of Operation," MicroPower Direct, retrieved from http://micropowerdirect.com/PDF%20Files/Application%20Notes/Power%20Supply%20Theory%20of%20Operation.pdf, Apr. 18, 2012, 6 pages.

(Continued)

*Primary Examiner* — Thienvu Tran
*Assistant Examiner* — Kevin J Comber
(74) *Attorney, Agent, or Firm* — Seed IP Law Group LLP (57) ABSTRACT

Systems and methods are disclosed for providing over-voltage protection for power converters. An over-voltage protection loop includes an error amplifier that maintains an external reference voltage within a highly precise range that can be used to provide a highly precise output voltage from the over-voltage protection loop. The over-voltage protection loop may also include feedback impedance that delays the output of the over-voltage protection loop. The delay may prevent the over-voltage protection loop from being engaged due to voltage transients output from a main servo loop circuit that provides a nominal output voltage under normal operation, thus allowing the threshold voltage and output voltage of the over-voltage protection loop to be set close to the nominal output voltage of the main servo loop circuit.

1 Claim, 8 Drawing Sheets

(56) References Cited

U.S. PATENT DOCUMENTS

| | | |
|---|---|---|
| 4,618,812 A | 10/1986 | Kawakami |
| 4,635,002 A | 1/1987 | Riebeek |
| 4,683,527 A | 7/1987 | Rosa |
| 4,719,552 A | 1/1988 | Albach et al. |
| 4,743,835 A | 5/1988 | Bossé et al. |
| 4,813,126 A | 3/1989 | Williamson |
| 4,814,735 A | 3/1989 | Williamson |
| 4,833,437 A | 5/1989 | Williamson |
| 4,837,535 A | 6/1989 | Konishi et al. |
| 4,920,309 A | 4/1990 | Szepesi |
| 4,956,626 A | 9/1990 | Hoppe et al. |
| 4,992,919 A | 2/1991 | Lee et al. |
| 5,031,066 A | 7/1991 | Wagner et al. |
| 5,068,774 A | 11/1991 | Rosa |
| 5,148,357 A | 9/1992 | Paice |
| 5,329,695 A | 7/1994 | Traskos et al. |
| 5,343,383 A | 8/1994 | Shinada et al. |
| 5,396,165 A | 3/1995 | Hwang et al. |
| 5,418,502 A | 5/1995 | Ma et al. |
| 5,430,640 A | 7/1995 | Lee |
| 5,436,550 A | 7/1995 | Arakawa |
| 5,469,124 A | 11/1995 | O'Donnell et al. |
| 5,481,225 A | 1/1996 | Lumsden et al. |
| 5,521,807 A | 5/1996 | Chen et al. |
| 5,631,822 A | 5/1997 | Silberkleit et al. |
| 5,638,262 A | 6/1997 | Brown |
| 5,691,629 A | 11/1997 | Belnap |
| 5,694,303 A | 12/1997 | Silberkleit et al. |
| 5,708,571 A | 1/1998 | Shinada |
| 5,734,563 A | 3/1998 | Shinada |
| 5,774,347 A | 6/1998 | Nakanishi |
| 5,777,866 A | 7/1998 | Jacobs et al. |
| 5,831,418 A | 11/1998 | Kitagawa |
| 5,903,504 A | 5/1999 | Chevallier et al. |
| 5,917,716 A | 6/1999 | Cho |
| 5,963,438 A | 10/1999 | Chen |
| 6,002,183 A | 12/1999 | Iversen et al. |
| 6,002,318 A | 12/1999 | Werner et al. |
| 6,038,148 A | 3/2000 | Farrington et al. |
| 6,043,705 A | 3/2000 | Jiang |
| 6,091,616 A | 7/2000 | Jacobs et al. |
| 6,101,104 A | 8/2000 | Eng |
| 6,137,373 A | 10/2000 | Mori |
| 6,141,232 A | 10/2000 | Weinmeier et al. |
| 6,157,180 A | 12/2000 | Kuo |
| 6,157,282 A | 12/2000 | Hopkinson |
| 6,169,674 B1 | 1/2001 | Owen |
| 6,191,964 B1 | 2/2001 | Boylan et al. |
| 6,198,647 B1 | 3/2001 | Zhou et al. |
| 6,232,832 B1 | 5/2001 | Kirkpatrick, II |
| 6,236,197 B1 | 5/2001 | Holdsclaw et al. |
| 6,252,781 B1 | 6/2001 | Rinne et al. |
| 6,304,463 B1 | 10/2001 | Krugly |
| 6,335,872 B1 | 1/2002 | Zhou et al. |
| 6,343,026 B1 | 1/2002 | Perry |
| 6,456,511 B1 | 9/2002 | Wong |
| 6,469,478 B1 | 10/2002 | Curtin |
| 6,472,852 B1 | 10/2002 | Lethellier |
| 6,487,097 B2 | 11/2002 | Popescu |
| 6,490,183 B2 | 12/2002 | Zhang |
| 6,492,890 B1 | 12/2002 | Woznlczka |
| 6,545,534 B1 | 4/2003 | Mehr |
| 6,563,719 B1 | 5/2003 | Hua et al. |
| 6,617,948 B2 | 9/2003 | Kuroshima et al. |
| 6,618,274 B2 | 9/2003 | Boylan et al. |
| 6,643,151 B1 | 11/2003 | Nebrigic et al. |
| 6,664,660 B2 | 12/2003 | Tsai |
| 6,697,955 B1 | 2/2004 | Malik et al. |
| 6,707,650 B2 | 3/2004 | Diallo et al. |
| 6,711,039 B2 | 3/2004 | Brkovic |
| 6,734,775 B2 | 5/2004 | Chung |
| 6,760,235 B2 | 7/2004 | Lin et al. |
| 6,798,177 B1 | 9/2004 | Liu et al. |
| 6,839,246 B1 | 1/2005 | Zhang et al. |
| 6,850,048 B2 | 2/2005 | Orr et al. |
| 6,998,901 B2 | 2/2006 | Lee |
| 7,012,413 B1 | 3/2006 | Ye |
| 7,046,492 B2 | 5/2006 | Fromm et al. |
| 7,061,212 B2 | 6/2006 | Phadke |
| 7,095,215 B2 | 8/2006 | Liu et al. |
| 7,129,808 B2 | 10/2006 | Roebke et al. |
| 7,164,584 B2 | 1/2007 | Walz |
| 7,183,727 B2 | 2/2007 | Ferguson et al. |
| 7,199,563 B2 | 4/2007 | Ikezawa |
| 7,202,644 B2 | 4/2007 | Nitta et al. |
| 7,206,210 B2 | 4/2007 | Harnett et al. |
| 7,212,416 B2 | 5/2007 | Kyono |
| 7,224,590 B2 | 5/2007 | Lin |
| 7,227,754 B2 | 6/2007 | Griesinger et al. |
| 7,286,376 B2 | 10/2007 | Yang |
| 7,304,828 B1 | 12/2007 | Shvartsman |
| 7,339,804 B2 | 3/2008 | Uchida |
| 7,369,024 B2 | 5/2008 | Yargole et al. |
| 7,443,278 B2 | 10/2008 | Kawahata et al. |
| 7,480,158 B2 | 1/2009 | Moromizato et al. |
| 7,515,005 B2 | 4/2009 | Dan |
| 7,564,706 B1 | 7/2009 | Herbert |
| 7,577,539 B2 | 8/2009 | Hubanks et al. |
| 7,579,901 B2 | 8/2009 | Yamashita |
| 7,602,273 B2 | 10/2009 | Yoshikawa |
| 7,616,459 B2 | 11/2009 | Huynh et al. |
| 7,616,464 B2 | 11/2009 | Phadke et al. |
| 7,663,896 B2 | 2/2010 | Na |
| 7,730,981 B2 | 6/2010 | McCabe et al. |
| 7,742,318 B2 | 6/2010 | Fu et al. |
| 7,773,392 B2 | 8/2010 | Matsumoto |
| 7,786,712 B2 | 8/2010 | Williams |
| 7,847,519 B2 | 12/2010 | Ho |
| 7,884,317 B2 | 2/2011 | Casper |
| 7,893,804 B2 | 2/2011 | Kaveh Ahangar et al. |
| 7,933,131 B2 | 4/2011 | Cho et al. |
| 8,009,004 B2 | 8/2011 | Ahangar et al. |
| 8,040,699 B2 | 10/2011 | Huynh et al. |
| 8,067,992 B2 | 11/2011 | Chen et al. |
| 8,072,195 B2 | 12/2011 | Aan De Stegge et al. |
| 8,102,162 B2 | 1/2012 | Moussaoui et al. |
| 8,233,293 B2 | 7/2012 | Selvaraju et al. |
| 8,279,631 B2 | 10/2012 | Yang |
| 8,350,659 B2 | 1/2013 | Dziubek et al. |
| 8,358,118 B2 | 1/2013 | Chen et al. |
| 8,373,403 B1 | 2/2013 | Radovic |
| 8,378,647 B2 | 2/2013 | Yonezawa et al. |
| 8,508,195 B2 | 8/2013 | Uno |
| 8,520,415 B1 | 8/2013 | Krishnamoorthy et al. |
| 8,552,589 B2 | 10/2013 | Ghosh et al. |
| 8,570,006 B2 | 10/2013 | Moussaoui et al. |
| 8,649,128 B2 | 2/2014 | Wang et al. |
| 8,710,820 B2 | 4/2014 | Parker |
| 8,736,240 B2 | 5/2014 | Liu et al. |
| 8,760,082 B2 | 6/2014 | Yang et al. |
| 8,764,247 B2 | 7/2014 | Pattekar et al. |
| 8,810,214 B2 | 8/2014 | Van Dijk et al. |
| 8,824,167 B2 | 9/2014 | Hughes et al. |
| 8,829,868 B2 | 9/2014 | Waltman et al. |
| 8,866,551 B2 | 10/2014 | Lam et al. |
| 8,873,263 B2 | 10/2014 | Feng et al. |
| 8,885,308 B2 | 11/2014 | Waltman et al. |
| 8,890,630 B2 | 11/2014 | Hughes |
| 9,030,178 B2 | 5/2015 | Chang et al. |
| 9,041,378 B1 | 5/2015 | Lam et al. |
| 9,160,228 B1 | 10/2015 | Parker et al. |
| 9,230,726 B1 | 1/2016 | Parker et al. |
| 9,293,999 B1 | 3/2016 | Lam et al. |
| 9,419,538 B2 | 8/2016 | Furmanczyk et al. |
| 2002/0015320 A1 | 2/2002 | Mochikawa et al. |
| 2002/0071300 A1 | 6/2002 | Jang et al. |
| 2004/0125523 A1 | 7/2004 | Edwards et al. |
| 2004/0169498 A1 | 9/2004 | Goder et al. |
| 2004/0178776 A1 | 9/2004 | Hansen et al. |
| 2004/0178846 A1 | 9/2004 | Kuyel et al. |
| 2006/0039172 A1 | 2/2006 | Soldano |
| 2006/0132105 A1 | 6/2006 | Prasad et al. |
| 2006/0132272 A1 | 6/2006 | Kitahara et al. |
| 2006/0212138 A1 | 9/2006 | Zhang |

(56) References Cited

U.S. PATENT DOCUMENTS

| | | |
|---|---|---|
| 2006/0220629 A1 | 10/2006 | Saito et al. |
| 2006/0227582 A1 | 10/2006 | Wei et al. |
| 2007/0152644 A1 | 7/2007 | Vinn |
| 2007/0257733 A1 | 11/2007 | Laletin |
| 2008/0024951 A1 | 1/2008 | Mortensen et al. |
| 2008/0031014 A1 | 2/2008 | Young |
| 2008/0150670 A1 | 6/2008 | Chung et al. |
| 2008/0174396 A1 | 7/2008 | Choi et al. |
| 2008/0186121 A1 | 8/2008 | Kawahata et al. |
| 2008/0197724 A1 | 8/2008 | Cullen et al. |
| 2008/0303606 A1 | 12/2008 | Liu et al. |
| 2009/0067206 A1 | 3/2009 | Oguchi et al. |
| 2009/0128110 A1 | 5/2009 | DeLurio et al. |
| 2009/0154204 A1 | 6/2009 | Taylor |
| 2009/0167432 A1 | 7/2009 | van den Heuvel |
| 2009/0174381 A1 | 7/2009 | Ojanen et al. |
| 2009/0231029 A1 | 9/2009 | Randlett |
| 2009/0237057 A1 | 9/2009 | Dishman et al. |
| 2009/0256547 A1 | 10/2009 | Akyildiz et al. |
| 2009/0273431 A1 | 11/2009 | Hurst |
| 2009/0302775 A1 | 12/2009 | Alexandrov |
| 2009/0321045 A1 | 12/2009 | Hernon et al. |
| 2009/0321046 A1 | 12/2009 | Hernon et al. |
| 2010/0008112 A1 | 1/2010 | Feng et al. |
| 2010/0014330 A1 | 1/2010 | Chang et al. |
| 2010/0117715 A1 | 5/2010 | Ariyama |
| 2010/0176755 A1 | 7/2010 | Hoadley et al. |
| 2010/0253309 A1 | 10/2010 | Xi et al. |
| 2011/0090038 A1 | 4/2011 | Perchlik |
| 2011/0103105 A1 | 5/2011 | Wei et al. |
| 2011/0169471 A1 | 7/2011 | Nagasawa |
| 2012/0268227 A1 | 10/2012 | Howes et al. |
| 2013/0021008 A1 | 1/2013 | Hume et al. |
| 2013/0049918 A1 | 2/2013 | Fu et al. |
| 2013/0121043 A1 | 5/2013 | Pietkiewicz |
| 2013/0201631 A1 | 8/2013 | Parker et al. |
| 2013/0245854 A1 | 9/2013 | Rinne et al. |
| 2013/0299148 A1 | 11/2013 | Hernon et al. |
| 2014/0015629 A1 | 1/2014 | Zeng et al. |
| 2014/0022824 A1* | 1/2014 | Huang ............ H02M 3/33523 363/21.12 |
| 2014/0118946 A1 | 5/2014 | Tong et al. |
| 2014/0192561 A1* | 7/2014 | Plesnik ............ H02M 3/33546 363/21.06 |
| 2014/0292288 A1 | 10/2014 | Yan et al. |
| 2014/0327417 A1 | 11/2014 | Zhu et al. |
| 2015/0137412 A1 | 5/2015 | Schalansky |
| 2015/0229149 A1 | 8/2015 | Fahlenkamp et al. |
| 2016/0261194 A1 | 9/2016 | Lam et al. |

FOREIGN PATENT DOCUMENTS

| | | |
|---|---|---|
| CN | 201219235 Y | 4/2009 |
| CN | 103582997 A | 2/2014 |
| CN | 104704742 A | 6/2015 |
| EP | 1 933 340 A1 | 6/2008 |
| GB | 1071469 A | 6/1967 |
| GB | 1114013 A | 5/1968 |
| JP | 55-1761 A | 1/1980 |
| JP | 55-130208 A | 10/1980 |
| JP | 62-32714 A | 2/1987 |
| JP | 2567069 B2 | 6/1993 |
| JP | 8-78252 A | 3/1996 |
| JP | 2001-320250 A | 11/2001 |
| JP | 2002-076799 A | 3/2002 |
| JP | 2003-173913 A | 6/2003 |
| JP | 2007-215359 A | 8/2007 |
| JP | 2007-362944 A | 10/2007 |
| JP | 2008-185398 A | 8/2008 |
| JP | 2009-100120 A | 5/2009 |
| JP | 2009-106012 A | 5/2009 |
| JP | 5030216 B2 | 9/2012 |
| KR | 10-2007-0118409 A | 12/2007 |
| KR | 10-2008-0019196 A | 3/2008 |
| KR | 10-2008-0101784 A | 11/2008 |
| KR | 10-2013-0026714 A | 3/2013 |
| WO | 99/41957 A1 | 8/1999 |
| WO | 01/22444 A1 | 3/2001 |
| WO | 02/097974 A2 | 12/2002 |
| WO | 2011/123680 A2 | 10/2011 |
| WO | 2012/100810 A1 | 8/2012 |
| WO | 2012/116263 A1 | 8/2012 |
| WO | 2014/039982 A1 | 3/2014 |
| WO | 2014/103298 A1 | 7/2014 |
| WO | 2017/015143 A1 | 1/2017 |

OTHER PUBLICATIONS

"Application Note 664 Feedback Isolation Augments Power-Supply Safety and Performance," Maxim Integrated, Jan. 22, 2001, retrieved from https://www.maximintegrated.com/en/app-notes/index.mvp/id/664, 6 pages.

"Buck converter," URL= http://en.wikipedia.org/wiki/Buck_converter, download date Jun. 23, 2011, 14 pages.

"EMI Suppression Filters (EMIFIL®) for AC Power Lines," Murata Manufacturing Co., Ltd., Cat.No. 009E-14, downloaded on Feb. 21, 2014, 27 pages.

"Maximum Flexible Power (MFP) Single Output Point of Load: Technical Preview—3—6 VDC in, 7 Amp, Non-Isolated DC/DC Converter," Crane Aerospace & Electronics Power Solutions, 2010, 17 pages.

"Step-gap "E" core swing chokes: Improved regulation and higher efficiency are possible when operating at minimum current levels," Technical Bulletin: Bulletin FC-S4, Magnetics Division, Spang & Company, Butler, Pennsylvania, 2001, 4 pages.

"Synchronous Rectification Aids Low-Voltage Power Supplies," Maxim Integrated Products, URL= http://www.maxim-ic.com/app-notes/index.mvp/id/652, download date Jun. 22, 2011, 6 pages.

Beta Dyne, "Synchronous Rectification," Application Note DC-006, DC/DC Converters, 2002, 3 pages.

Bottrill, "The Effects of Turning off a Converter with Self-Driven Synchronous Rectifiers," Power Guru, May 1, 2007, retrieved from http://www.powerguru.org/the-effects-of-turning-off-a-converter-with-self-driven-synchronous-rectifiers/ Jul. 10, 2015, 6 pages.

Chinese Office Action, issued May 22, 2015, for Chinese Application No. 201280016631.1, 15 pages (with Partial English Translation).

Coates, "Power supplies—3.0 Switched Mode Power Supplies," www.learnabout-electronics.org, 2007-2013, 20 pages.

Cuon et al., "Dynamic Maneuvering Configuration of Multiple Control Modes in a Unified Servo System," Amendment filed Mar. 6, 2015, for U.S. Appl. No. 14/333,705, 11 pages.

Dixon, "Unitrode Application Note Average Current Mode Control of Switching Power Supplies," Texas Instruments Inc., 1999.

eCircuit Center, "Op Amp Offset Adjustment" 2002, retrieved from http://www.ecircuitcenter.com/Circuits/op_voff/op_voff2.htm on Mar. 26, 2012, 3 pages.

eCircuit Center, "Op Amp Offset Voltage," 2002, retrieved from http://www.ecircuitcenter.com/Circuits/op_voff/op_voff.htm on Mar. 26, 2012, 3 pages.

Extended European Search Report, dated Apr. 15, 2016 for corresponding European Application No. 13835620.9, 7 pages.

Furmanczyk et al., "AC/DC Power Conversion System and Method of Manufacture of the Same," Notice of Allowance, dated Apr. 25, 2016, for U.S. Appl. No. 14/001,312, 9 pages.

Hughes et al., "Self Synchronizing Power Converter Apparatus and Method Suitable for Auxiliary Bias for Dynamic Load Applications," Notice of Allowance mailed May 14, 2014, for U.S. Appl. No. 13/185,217, 10 pages.

Hughes, "Oscillator Apparatus and Method With Wide Adjustable Frequency Range," Office Action mailed Jun. 5, 2013, for U.S. Appl. No. 13/185,152, 17 pages.

Hughes, "Oscillator Apparatus and Method With Wide Adjustable Frequency Range," Amendment filed Oct. 7, 2013, for U.S. Appl. No. 13/185,152, 15 pages.

(56) References Cited

OTHER PUBLICATIONS

Hughes, "Oscillator Apparatus and Method With Wide Adjustable Frequency Range," Office Action mailed Jan. 28, 2014, for U.S. Appl. No. 13/185,152, 15 pages.
Hughes, "Oscillator Apparatus and Method With Wide Adjustable Frequency Range," Amendment filed Apr. 24, 2014, for U.S. Appl. No. 13/185,152, 8 pages.
Hughes, "Oscillator Apparatus and Method With Wide Adjustable Frequency Range," Notice of Allowance mailed Jul. 14, 2014, for USAN 13/185,152, 12 pages.
Hume et al., "Power Converter Apparatus and Method With Compensation for Light Load Conditions," Office Action mailed Nov. 6, 2013, for U.S. Appl. No. 13/185,142, 11 pages.
International Search Report and Written Opinion of the International Searching Authority, mailed May 31, 2016, for corresponding International Application No. PCT/US2016/018628, 12 pages.
International Search Report and Written Opinion of the International Searching Authority, mailed Jun. 21, 2016, for corresponding International Application No. PCT/US2016/019520, 14 pages.
International Search Report and Written Opinion, mailed Oct. 12, 2016, for corresponding International Application No. PCT/US2016/042582, 11 pages.
International Search Report, dated Aug. 12, 2002, for PCT/US01/50033, 1 pages.
International Search Report, mailed Aug. 31, 2015 for PCT/US2015/033321, 9 pages.
International Search Report, mailed Dec. 20, 2013, for PCT/US2013/058784, 3 pages.
International Search Report, mailed Jun. 8, 2011, for PCT/US2010/052705, 5 pages.
International Search Report, mailed Jun. 8, 2011, for PCT/US2010/052707, 5 pages.
International Search Report, mailed Oct. 14, 2011, for PCT/US2011/030778, 3 pages.
Irving et al., "Analysis and Design Optimization of Magnetic-Feedback Control Using Amplitude Modulation," *IEEE Transactions on Power Electronics* 24(2):426-433, Feb. 2009.
Jovanović et al., "Design Considerations for Forward Converter with Synchronous Rectifiers," Power Conversion Proceedings, pp. 340-350, Oct. 1993.
King et al., "Active Clamp Control Boosts Forward Converter Efficiency," *Power Electronics Technology*, pp. 52-55, Jun. 2003.
Kristjansson et al., "Solutions to Today's Low Voltage Power Design Challenges Using High-Efficiency, Non-Isolated Point of Load Converters: A Discussion of the Interpoint™ MFP Series™ Point of Load Converter," Crane Aerospace & Electronics, Power Solutions—Interpoint Products, Redmond, WA, Oct. 2011, Revised Jan. 2012, 25 pages.
Kuehny et al., "Output Filter for Use With Power Converters, for Example DC/DC Power Converters, for Instance Interpoint MFP POL DC/DC Power Converters," U.S. Appl. No. 61/547,327, filed Oct. 14, 2011, 14 pages.
Lam et al., "Automatic Enhanced Self-Driven Synchronous Rectification for Power Converters," Notice of Allowance, for U.S. Appl. No. 14/848,859, mailed Dec. 10, 2015, 29 pages.
Lam et al., "Automatic Enhanced Self-Driven Synchronous Rectification for Power Converters for Wide Input Range and High Output Voltage Without Tertiary Winding," U.S. Appl. No. 62/193,755, filed Jul. 17, 2015, 53 pages.
Lam et al., "Dynamic Maneuvering Configuration for Multiple Control Modes in a Unified Servo System," Office Action mailed Dec. 23, 2014, for U.S. Appl. No. 14/333,705, 6 pages.
Lam et al., "Dynamic Sharing Average Current Mode Control for Active-Reset and Self-Driven Synchronous Rectification for Power Converters," Amendment filed Feb. 15, 2017 for U.S. Appl. No. 15/178,968, 22 pages.
Lam et al., "Dynamic Sharing Average Current Mode Control for Active-Reset and Self-Driven Synchronous Rectification for Power Converters," U.S. Appl. No. 15/178,968, filed Jun. 10, 2016, 39 pages.
Lam et al., "Proactively Operational Over-Voltage Protection Circuit," U.S. Appl. No. 15/374,116, filed Dec. 9, 2016, 32 pages.
Lam et al., "Impedance Compensation for Operational Amplifiers Used in Variable Environments," Office Action mailed Feb. 7, 2014, for U.S. Appl. No. 13/609,107, 11 pages.
Lam et al., "Impedance Compensation for Operational Amplifiers Used in Variable Environments," Amendment filed May 6, 2014, for U.S. Appl. No. 13/609,107, 12 pages.
Lam et al., "Impedance Compensation for Operational Amplifiers Used in Variable Environments," Notice of Allowance mailed Jun. 27, 2014, for U.S. Appl. No. 13/609,107, 9 pages.
Manfredi et al., "Additive Manufacturing of Al Alloys and Aluminium Matrix Composites (AMCs)," in Monteiro (ed.), *Light Metal Alloys Applications*, InTech Jun. 11, 2014, 32 pages.
Mappus, "Synchronous Rectification for Forward Converters," Fairchild Semiconductor Power Seminar 2010-2011, 19 pages.
Merriam-Webster, "Directly," retrieved from http://www.merriam-webster.com/dictionary/directly, on Nov. 6, 2012, 1 page.
Mitsuya, "Basics of Noise Countermeasures—Lesson 14: Using Common Mode Choke Coils for Power Supply Lines," Murata Manufacturing Co., Ltd., Oct. 28, 2014, retrieved on Feb. 4, 2015, from http://www.murata.com/en-eu/products/emiconfun/emc/2014/10/28/en-20141028-p1, 3 pages.
Ng, "Implementing Constant Current Constant Voltage AC Adapter by NCP1200 and NCP4300A," on Semiconductor, Application Note, Publication Order No. AND8042/D, Feb. 2001, 12 pages.
Nguyen et al., "Nulling Input Offset Voltage of Operational Amplifiers," Mixed Signal Products, Texas Instruments—Application Report SLOA045, Aug. 2000, pp. 1-15.
Notice for Reasons for Rejections from the Japanese Patent Office with English Translation, dated Apr. 18, 2016, for corresponding Japanese Application No. 2015-531290, 5 pages.
Office Action mailed Nov. 18, 2016 for U.S. Appl. No. 15/178,968, Lam et al., "Dynamic Sharing Average Current Mode Control for Active-Reset and Self-Driven Synchronous Rectification for Power Converters," 20 pages.
Ou et al., "Magnetic Feedback Ranks High in Military Converters," *Power Electronics Technology*:14-19, Jul. 2005.
Parker et al., "Integrated Tri-State Electromagnetic Interference Filter and Line Conditioning Module," Office Action mailed Apr. 24, 2015, for U.S. Appl. No. 14/632,818, 11 pages.
Parker et al., "Transformer-Based Power Converters With 3D Printed Microchannel Heat Sink," Office Action mailed Apr. 16, 2015, for U.S. Appl. No. 14/627,556, 9 pages.
Parker et al., "Transformer-Based Power Converters With 3D Printed Microchannel Heat Sink," Office Action, dated Aug. 3, 2015, for U.S. Appl. No. 14/627,556, 11 pages.
Parker, "Switched Capacitor Hold-Up Scheme for Constant Boost Output Voltage," Office Action mailed Mar. 28, 2012, for U.S. Appl. No. 12/751,067, 16 pages.
Parker, "Switched Capacitor Hold-Up Scheme for Constant Boost Output Voltage," Amendment filed Jul. 30, 2012, for U.S. Appl. No. 12/751,067, 18 pages.
Parker, "Switched Capacitor Hold-Up Scheme for Constant Boost Output Voltage," Office Action mailed Nov. 16, 2012, for U.S. Appl. No. 12/751,067, 20 pages.
Parker, "Switched Capacitor Hold-Up Scheme for Constant Boost Output Voltage," Amendment filed Jan. 16, 2013, for U.S. Appl. No. 12/751,067, 15 pages.
Parker, "Switched Capacitor Hold-Up Scheme for Constant Boost Output Voltage," Amendment filed Feb. 15, 2013, for U.S. Appl. No. 12/751,067, 15 pages.
Parker, "Switched Capacitor Hold-Up Scheme for Constant Boost Output Voltage," Office Action mailed Jul. 30, 2013, for U.S. Appl. No. 12/751,067, 18 pages.
Parker, "Switched Capacitor Hold-Up Scheme for Constant Boost Output Voltage," Amendment filed Oct. 30, 2013, for U.S. Appl. No. 12/751,067, 19 pages.
Parker, "Switched Capacitor Hold-Up Scheme for Constant Boost Output Voltage," Notice of Allowance mailed Feb. 3, 2014, for U.S. Appl. No. 12/751,067, 11 pages.

(56) References Cited

OTHER PUBLICATIONS

Pascu, "Error Amplifier with Forced Equilibrium Adaptor," Kepco, Inc., retrieved from http://www.kepcopower.com/equibm2.htm#fig2, dated May 22, 2014, 8 pages.

Peter, "Synchronous rectifier in DC/DC converters," Oct. 5, 2009, retrieved from http://www.posterus.sk/?p=2535, on Jul. 10, 2015, 11 pages.

Plesnik, "A New Method for Driving Synchronous Rectifiers," IEICE/IEEE INTELEC'03, Oct. 19-23, Yokohama, Japan, pp. 274-281, 2003.

Shrisavar, "Introduction to Power Management," Texas Instruments, Biracha Digital Power Ltd., 2014, 37 pages.

Waltman et al., "Input Control Apparatus and Method With Inrush Current, Under and Over Voltage Handling," Office Action mailed Jun. 17, 2014, for U.S. Appl. No. 13/185,210, 8 pages.

Waltman et al., "Power Converter Apparatus and Method With Compensation for Current Limit/Current Share Operation," Office Action mailed Dec. 17, 2013, for U.S. Appl. No. 13/185,172, 15 pages.

Waltman et al., "Power Converter Apparatus and Method With Compensation for Current Limit/Current Share Operation," Amendment filed Mar. 17, 2014, for U.S. Appl. No. 13/185,172, 16 pages.

Waltman et al., "Power Converter Apparatus and Method With Compensation for Current Limit/Current Share Operation," Notice of Allowance mailed May 8, 2014, for U.S. Appl. No. 13/185,172, 10 pages.

Waltman et al., "Power Converter Apparatus and Methods," U.S. Appl. No. 61/508,937, filed Jul. 18, 2011, 139 pages.

Written Opinion, mailed Dec. 20, 2013, for PCT/US2013/058784, 4 pages.

Written Opinion, mailed Oct. 14, 2011, for PCT/US2011/030778, 5 pages.

Xing et al., "Power System Architecture with Back-Up Power for Servers," ERC Program of the National Science Foundation, 5 pages.

Zhang, *Synchronous Rectification, Paralleling, Interleaving, Thermal*, Chapter Two, "Synchronous Rectification," pp. 9-72, PDF created Feb. 20, 1997.

\* cited by examiner

PROACTIVELY OPERATIONAL OVER-VOLTAGE PROTECTION CIRCUIT

BACKGROUND

Technical Field

The present disclosure generally relates to providing over-voltage protection in a proactively operational way.

Description of the Related Art

Power converters alter electrical energy from one form to another. For example, some power converters transform AC power signals to DC power signals, and vice versa, whereas some power converters alter the frequency and/or voltage of an input power signal. A DC/DC converter converts an input DC voltage to a different output DC voltage. Such converters typically include a transformer that is electrically coupled via a switching circuit between a voltage source and a load. Such converters are also typically controlled by a closed-loop feedback system that is designed such that the converter maintains the output voltage within a pre-defined and highly precise range. If the feedback loop fails, though, the output voltage may increase uncontrollably until the converter or the load, or both, is damaged.

Designers incorporate over-voltage protection into power converter system to prevent a feedback loop failure from further damaging the transformer circuit or the load. Over voltage protection may be incorporated into other systems in which a feedback loop is used under normal operation to prevent the output voltage from exceeding a certain level. Traditional systems and methods for providing over-voltage protection include implementations that use a latching scheme or a non-latching scheme. In a latching scheme, the power converter may be shut-down when an over-voltage situation occurs and remain shut-down until restarted, for example, by cycling the input power. In a non-latching scheme, the power converter may be power cycled in order to restart when an over-voltage situation occurs. If power cycling does not correct the over-voltage situation, though, the power converter may continue to operate in a faulty power cycling, or "hiccup," mode that stresses both the power converter and its load, thus compromising the circuitry's integrity and potentially reducing its useful lifetime. Moreover, traditional systems set a threshold value of 130% or more of the nominal operating voltage before the over-voltage protection circuit is engaged to provide the output voltage. A high voltage threshold is necessary to prevent false triggering of the over-voltage protection circuitry, but it also results in stressing and possibly damaging the converter and the load circuitry by applying an excessively high voltage. Accordingly, these traditional methods for providing over-voltage protection result in an output voltage that either is not usable by the load, or if used, may result in damage to the converter or to the load.

BRIEF SUMMARY

An over-voltage protection circuit for a transformer, the transformer to include a primary clock and feedback control circuit, a main servo loop circuit, and the over-voltage protection circuit, may be summarized as including an over-voltage winding magnetically coupled to a magnetic core, the over-voltage winding which, in response to a current on a primary winding in the primary clock and feedback control circuit, is activated to provide a secondary side voltage supply; an error amplifier electrically coupled to a first node and a second node, wherein the error amplifier uses the secondary side voltage supply to maintain a second voltage on the second node according to an internal reference voltage; a feedback impedance electrically coupled to the first node and to the second node, the feedback impedance which introduces a time delay to provide feedback from the first node to the second node; and an output voltage sensing circuit electrically coupled to at least the second node and an output node, the output voltage sensing circuit which controls an output voltage at the output node based on the second voltage, wherein the over-voltage protection circuit provides an output voltage for the transformer under an error condition. The feedback impedance may delay the over-voltage protection circuit from providing the output voltage for the transformer for a period of time. The period of time may be larger than the amount of time that the main servo loop circuit outputs a voltage transient. The output voltage provided by the over-voltage protection circuit may be within 5% of a nominal voltage output by the servo loop circuit. The voltage-control component may include a shunt regulator. The output voltage sensing circuit may include a first resistor and a second resistor, the first resistor having a first resistance and coupled to the second node and the output node, and the second resistor having a second resistance and coupled to the second node and ground, wherein the first resistance and the second resistance may be based at least in part on a value at which the error amplifier maintains the voltage of the second node. The error amplifier may include an op amp. The feedback impedance may include a capacitor. The magnetic core may be magnetically coupled to the main servo loop circuit. The magnetic core may be a first magnetic core that may be magnetically coupled to the over-voltage protection circuit and the primary clock and feedback control circuit, and wherein the main servo loop may be magnetically coupled to a second magnetic core.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

In the following description, certain specific details are set forth in order to provide a thorough understanding of various disclosed embodiments or implementations. However, one skilled in the relevant art will recognize that embodiments or implementations may be practiced without one or more of these specific details, or with other methods, components, materials, etc. In other instances, well-known structures associated with the various embodiments or implementations have not been shown or described in detail to avoid unnecessarily obscuring descriptions of the embodiments or implementations.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one embodiment," "an embodiment," "one implementation," or "an implementation" means that a particular feature, structure or characteristic described in connection with the embodiment or implementation is included in at least one embodiment or implementation. Thus, the appearances of the phrases "in one embodiment," "in an embodiment," "one implementation," or "an implementation" in various places throughout this specification are not necessarily all referring to the same embodiment or implementation. Furthermore, the particular features, structures, or characteristics may be combined in any suitable manner in one or more embodiments or implementations.

As used in this specification and the appended claims, the singular forms "a," "an," and "the" include plural referents unless the context clearly dictates otherwise. It should also be noted that the term "or" is generally employed in its broadest sense, that is, as meaning "and/or" unless the context clearly dictates otherwise.

The headings and Abstract of the Disclosure provided herein are for convenience only and do not interpret the scope or meaning of the embodiments or implementations.

One or more implementations of the present disclosure provide over-voltage protection for servo loop circuits that are operated with feedback controls as part of a power converter. The over-voltage protection is provided by an over-voltage protection circuit that is engaged when an output voltage of the servo loop circuit exceeds a threshold voltage such as may occur, for example, when the feedback control fails. In some implementations, the threshold voltage and the output voltage of the over-voltage protection circuit may be the same. The threshold and output voltages of the over-voltage protection circuit may be controlled by a voltage-controller that maintains a highly precise voltage difference between two nodes in the over-voltage protection circuit. Such a voltage-controller may include, for example, a shunt regulator implemented using an integrated circuit or optionally, implemented using an op amp and associated circuit components (e.g., resistors, capacitors, inductors, as discussed below). In some implementations, the output voltage of the over-voltage protection circuit is based on a highly precise voltage maintained by the voltage control structure at a specific node; further, the output voltage and/or the threshold voltage of the over-voltage protection circuit may be changed by using appropriate configurations of resistors or other electrical components.

In some implementations, the activation of the over-voltage protection circuit may be delayed by introducing an impedance into the feedback component of the voltage-controller structure of the over-voltage protection circuit. The feedback impedance may be provided, for example, by various combinations of resistors and/or capacitors. The values and configurations of the components providing the feedback impedance may be based at least in part upon the amount of delay desired for the servo loop circuit. The amount of delay, for example, can be based on the characteristics of voltage transients that may be expected to be output from a main servo loop circuit that provides the output power for the power converter under normal operation. In this situation, the delay may be set for a sufficient period of time such that the power converter continues to use the voltage output from the main servo loop circuit even when that voltage output experiences a voltage transient that momentarily exceeds the voltage threshold for engaging the over-voltage protection circuit. In some implementations, this delay period may be up to 400 μs.

The voltage-control structure and the feedback impedance allow the threshold of the over-voltage protection circuit to be set to within 105% of the nominal output voltage of the main servo loop circuit. Unlike traditional over-voltage protection circuits, the over-voltage protection circuit described herein includes a voltage-control structure that outputs a highly stable and precise voltage that allows the present over-voltage protection circuit to advantageously provide an operational output voltage to the load that does not compromise the load's integrity or durability. In addition, the over-voltage protection circuit described herein includes a feedback impedance that delays the over-voltage protection circuit from being engaged by the power converter for a period of time after the output voltage of the servo loop circuit exceeds a threshold voltage. The feedback impedance prevents the over-voltage protection circuit from being engaged because of voltage transients having peak values that momentarily exceed the threshold voltage. Accordingly, the feedback impedance may prevent the over-voltage protection circuit from falsely tripping due to voltage transients, thus allowing the threshold value of the over-voltage protection circuit to be set at a value close to (e.g., within 5%) of the nominal output voltage. Finally, the operation of the over-voltage protection circuit, as will be discussed herein, can be implemented using the same magnetic core that is also coupled to the servo loop circuit, thus minimizing the footprint and expense for implementing the over-voltage protection circuit.

Figure 1:
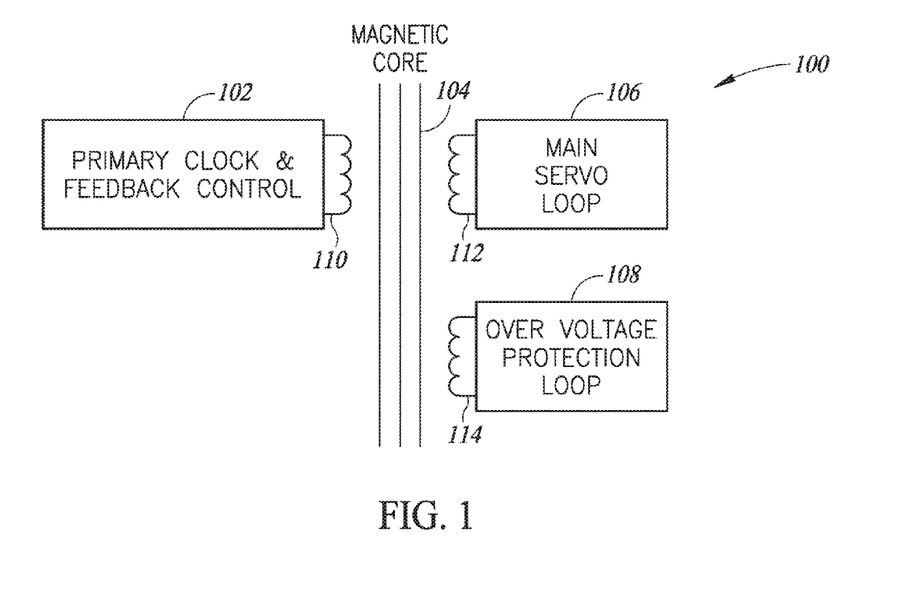
FIG. 1 is a block diagram illustrating components for voltage control of a power converter, according to at least one illustrated implementation.

FIG. 1 is a block diagram illustrating components of a power converter 100, according to at least one illustrated implementation. In some implementations, the power converter 100 includes a primary clock and feedback control 102, a magnetic core 104, a main servo loop 106, and an over-voltage protection circuit 108. The magnetic core 104 provides magnetic coupling between the primary clock and feedback control 102 and the main servo loop 106 using first primary winding 110 and first secondary winding 112. The magnetic core 104 also provides magnetic coupling between the primary clock and feedback control 102 and the over-voltage protection circuit 108 using first primary winding 110 and second secondary winding 114. Using the magnetic core 104 to magnetically couple both the main servo loop 106 and the over-voltage protection circuit 108 allows the over-voltage protection circuit 108 to occupy a smaller footprint within the power converter 100 by eliminating the need to provide an additional magnetic core.

The primary clock and feedback control 102 includes a primary side voltage that may be applied to the magnetic core 104 using one or more primary windings 110, causes a magnetizing energy to build up in the magnetic core 104, as discussed below. The magnetizing energy in the magnetic core 104 results in the primary side voltage being transferred using one or more secondary windings 112 and 114 in the main servo loop 106 and in the over-voltage protection circuit 108, respectively. The transferred voltage provides the secondary side voltage supply for the main servo loop 106 and for the over-voltage protection circuit 108. Under normal operation conditions, the main servo loop 106 provides the feedback for the power converter. The output power has a nominal voltage that can be used to drive a load. However, during an error situation, such as, for example, when the feedback control of the main servo loop 106 has broken down, the output voltage provided by the main servo loop 106 may increase uncontrollably. In this situation, power converter 100 may engage the over-voltage protection circuit 108 to provide the output voltage for the load. As described herein, the voltage provided by the over-voltage protection circuit 108 may be within 5% of the nominal voltage supplied by the main servo loop 106 during normal operations.

Figure 2:
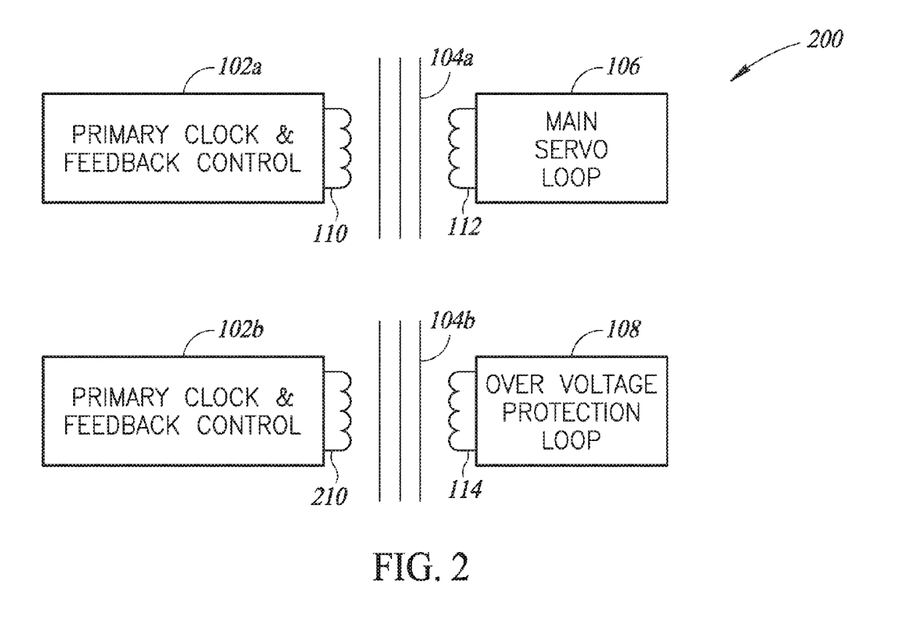
FIG. 2 is a block diagram illustrating components for voltage control of a power converter that uses two magnetic cores, according to at least one illustrated implementation.

FIG. 2 is a block diagram illustrating components of a power converter that uses two magnetic cores, according to at least one illustrated implementation. In this implementation, a power converter 200 has a first primary clock and feedback control 102a and a second primary clock and feedback control 102b. The first primary clock and feedback control 102a is magnetically coupled to the main servo loop 106 via a first magnetic core 104a using first primary winding 110 and first secondary winding 112. The second primary clock and feedback control 102b is magnetically coupled to the over-voltage protection circuit 108 via a second magnetic core 104b using second primary winding 210 and second secondary winding 114. In this implementation, the outputs of the first and the second primary clock and feedback controls 102a and 102b may be the same. Alternatively, the outputs of the first and the second primary clock and feedback controls 102a and 102b may be different. In addition, the main servo loop 106 and the over-voltage protection circuit 108 in the power converter 200 may operate in the same way as the main servo loop 106 and the over-voltage protection circuit 108, respectively, in the power converter 100.

Figure 3:
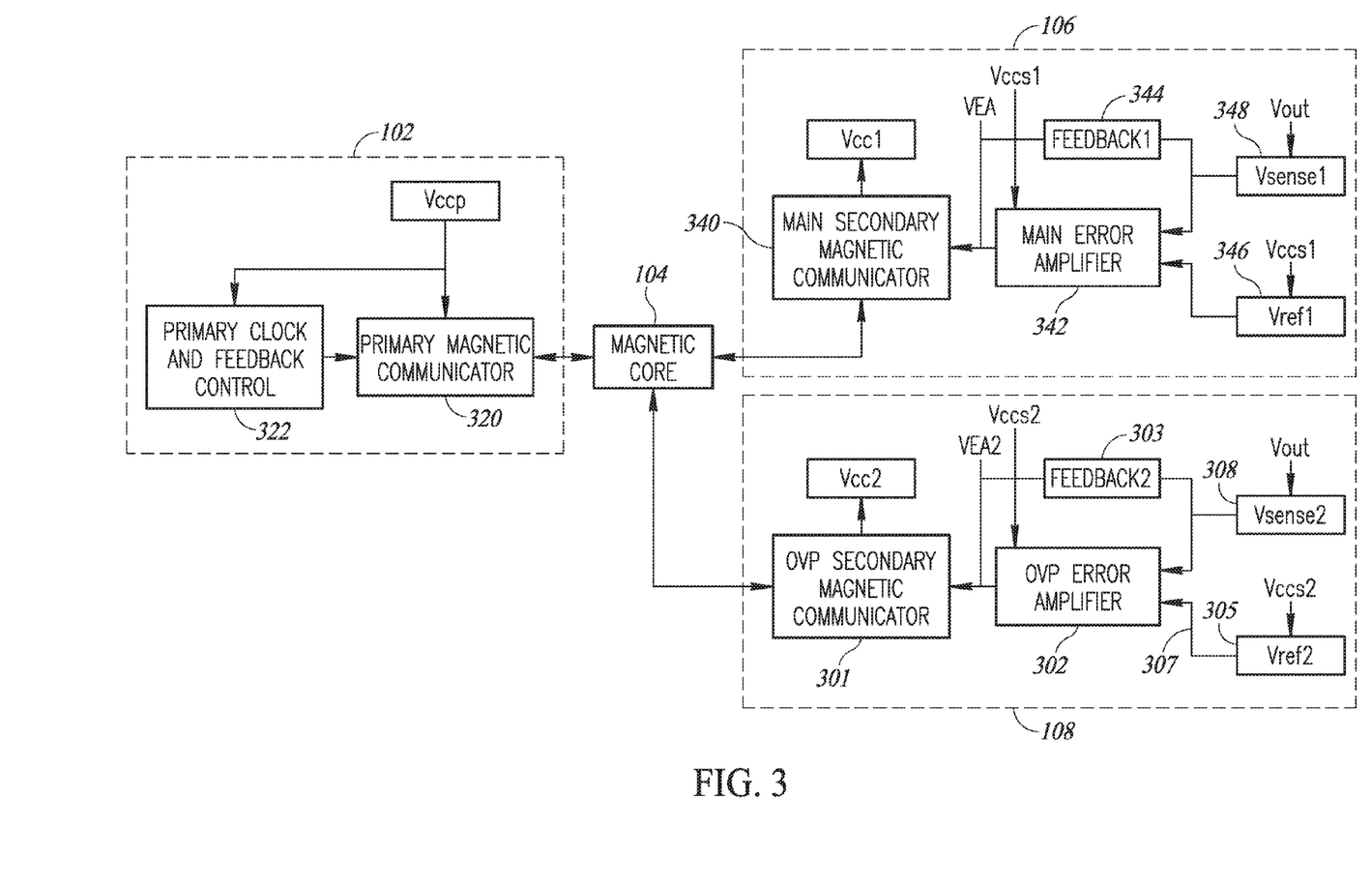
FIG. 3 is a block diagram illustrating components for voltage control of a magnetic feedback isolator, a magnetic core, a main servo loop, and an over-voltage protection circuit, according to one illustrated implementation

FIG. 3 is a block diagram illustrating components of a primary clock and feedback control 102, a magnetic core 104, a main servo loop 106, and an over-voltage protection circuit 108, according to one illustrated implementation. The primary clock and feedback control 102 includes a primary magnetic communicator 320 and a primary clock and feedback control 322. A primary side voltage $V_{CCP}$ is supplied to the primary magnetic communicator 320 to energize the magnetic core 104. This voltage is transferred to the main servo loop 106 and the over-voltage protection circuit 108 using one or more secondary magnetic communicators 301 and 340 as discussed below. The primary side voltage $V_{CCP}$ is not continuously supplied to the primary magnetic communicator 320. Instead, a signal from the primary clock and feedback control 322 controls the supply of the primary side voltage $V_{CCP}$, such as through a switching component, to the primary magnetic communicator 320. The time during which the primary side voltage $V_{CCP}$ is not supplied to the primary magnetic communicator 320 may be known as a "fly-back period" in which voltage that has been transferred to the main servo loop 106 or the over-voltage protection circuit 108 returns via a secondary winding back to the primary clock and feedback control 102 as a fly-back voltage. The primary clock and feedback control 322 may use this fly-back voltage (e.g., $V_{FB}$) to monitor and provide feedback regarding the output voltage provided by the main servo loop 106 and/or the over-voltage protection circuit 108.

The main servo loop 106 includes a main secondary magnetic communicator 340, a main error amplifier 342, a main feedback 344, and a main voltage reference 346. The main secondary magnetic communicator 340 is magnetically coupled to the magnetic core 104 through one or more secondary windings (e.g., first secondary winding 112). Accordingly, the primary side voltage $V_{CCP}$, when supplied to the primary magnetic communicator 320 in the primary clock and feedback control 102, is transferred to a winding (e.g., first secondary winding 112) in the main secondary magnetic communicator 340 as a main servo supply voltage $V_{CCS1}$. In addition, the main secondary magnetic communicator 340 may provide a voltage during the flyback period in which the primary supply side voltage $V_{CCP}$ is not supplied to the primary magnetic communicator 320. During the flyback period, the main secondary magnetic communicator 340 receives the output voltage (e.g., $V_{EA}$) from the main error amplifier 342 and provides this voltage to the primary magnetic communicator 320 as the flyback voltage ($V_{FB}$) that the primary magnetic communicator 320 supplies to the primary clock and feedback control 322 in the primary clock and feedback control 102.

The main secondary magnetic communicator 340 provides the main servo supply voltage $V_{CCS1}$ to the main voltage reference 346. The main voltage reference 346 is also electrically connected and supplies a reference voltage ($V_{Ref}$) to the main error amplifier 342. The output of the main error amplifier 342 is connected to the main feedback 344 and is returned to the main error amplifier 342 as a feedback signal. The feedback signal is also provided to the main output circuit 348, which provides the output voltage $V_{out}$ for the main servo loop 106. The main error amplifier 342 provides its output voltage $V_{EA}$ based on the difference between the feedback signal and the reference voltage $V_{Ref}$ received from the main voltage reference 346.

The over-voltage protection circuit 108 includes an over-voltage secondary magnetic communicator 301, an over-voltage protection error amplifier 302, a feedback impedance 303, a voltage reference 305, and an output voltage sensing circuit 308. The magnetic communicator 301 is magnetically coupled to the magnetic core 104. The magnetic core 104 in turn is magnetically coupled to the primary clock and feedback control 102. Accordingly, the primary side voltage $V_{CCP}$, when supplied to the primary magnetic communicator 320 in the primary clock and feedback control 102, is transferred to a winding (e.g., second secondary winding 114) in the over-voltage secondary magnetic communicator 301 as a secondary side voltage supply $V_{CCS2}$. In addition, the over-voltage secondary magnetic communicator 301 may provide a voltage to the over-voltage protection circuit 108 during a flyback period in which the primary supply side voltage $V_{CCP}$ is not applied to the primary magnetic communicator 320. During the flyback period, the over-voltage secondary magnetic communicator 301 may provide a voltage $V_{EA2}$ that is related to a primary-side feedback signal V supplied to the feedback control 322 in the primary clock and feedback control 102.

The over-voltage secondary magnetic communicator 301 provides the reference voltage $V_{CCS2}$ to the voltage reference 305, which is also electrically connected to the over-voltage protection amplifier 302. In some implementations, the over-voltage protection amplifier 302 may be a shunt regulator that controls the voltage and resulting current at its output in order to maintain a steady voltage $V_{ref}$ on a reference line 307, as discussed in further detail below. The feedback impedance 303 provides a connection that allows for a feedback signal to propagate from the output of the over-voltage protection error amplifier 302 to the input of the same error amplifier 302. The feedback impedance 303, however, includes components such as capacitors and/or resistors that introduce a propagation delay for the feedback signal. This propagation delay prevents the over-voltage protection circuit 108 from falsely tripping during a dynamic response time or period as the main servo loop 106 outputs a voltage transient. The feedback signal is also provided to the output voltage sensing circuit 308 to provide the over-voltage out signal $V_{out}$.

Figure 4:
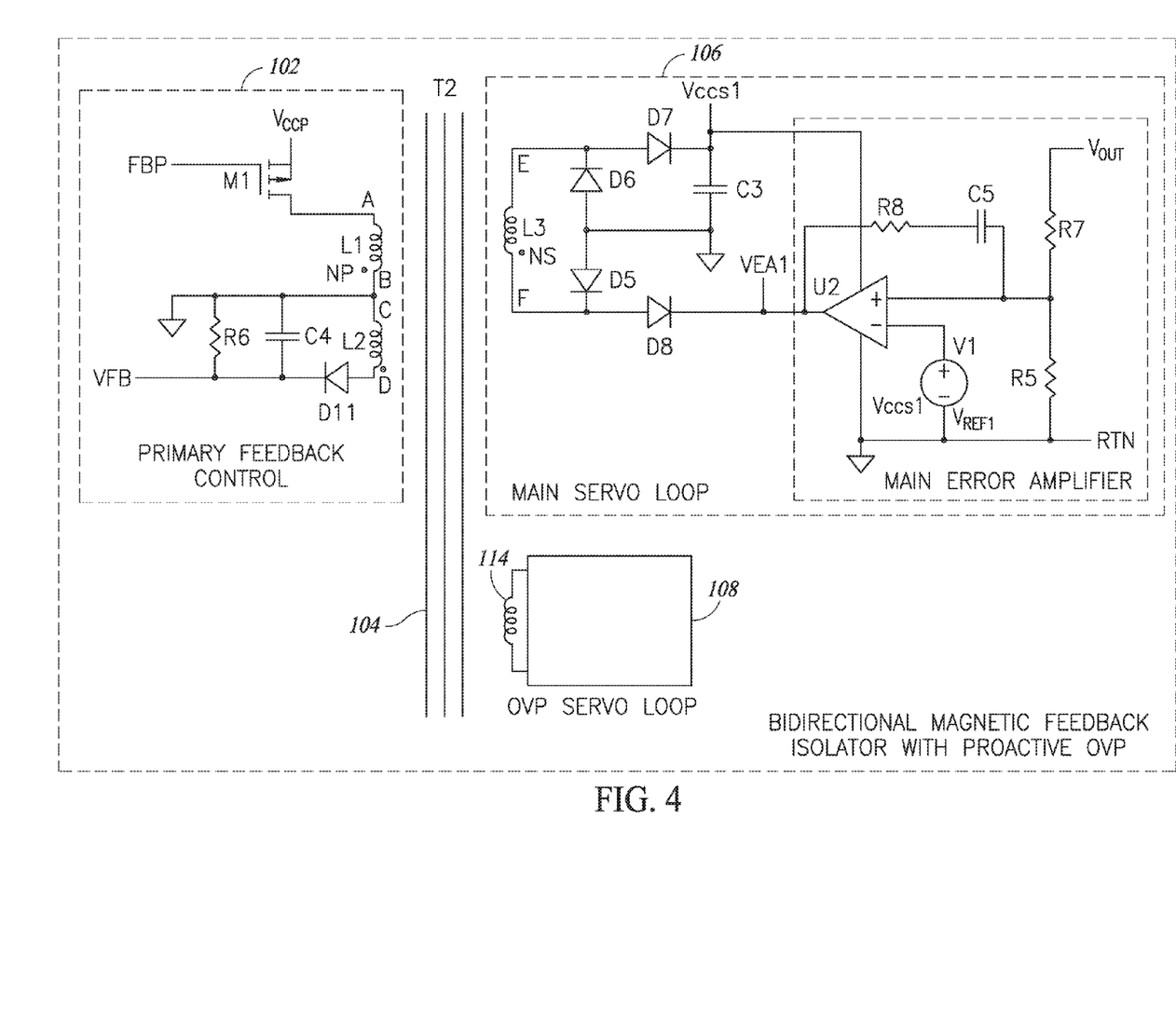
FIG. 4 is a block diagram illustrating components for voltage control of an over-voltage protection circuit, according to one illustrated embodiment.

FIG. 4 is a low level circuit diagram of a primary clock and feedback control 102 magnetically coupled to a main servo loop 106 via a magnetic core 104, according to one illustrated implementation. The magnetic core 104 has primary side windings L1 and L2 associated with the primary clock and feedback control 102 and a secondary side winding L3 associated with the main servo loop 106. The winding L1 is located between nodes A and B, the winding L2 is located between nodes C and D, and the winding L3 is located between nodes E and F. The turns ratio for the windings L1, L2, and L3 may be any turns ratio suitable for a particular application, for example, 1:1:1, 1:1:2, etc. A fixed frequency pulse signal may be provided at a sampling switch control node FBP which is coupled to a gate node of a switch M1. The switch M1 may be any type of suitable switch (e.g., MOSFET, insulated-gate bipolar transistor (IGBT)).

When the switch M1 is turned on, the winding L1 is coupled to a primary side voltage supply $V_{CCP}$. This causes a magnetizing energy to build up in the magnetic core 104. At this time, the voltage across nodes C and D of winding L2 is negative at the anode of a diode D11 so the diode D11 is not conducting. When the switch M1 is turned on, the voltage $V_{CCP}$ is transferred from A-B to E-F, which is then peak-charged into the capacitor C3 by diodes D5 and D7 to supply the secondary side supply voltage $V_{CCS1}$. In normal operation, the secondary side supply voltage $V_{CCS1}$ may have a nominal value.

The secondary side supply voltage $V_{CCS1}$ may be used to power an op amp U2. The op amp U2 has a positive input and a negative input, and provides an output signal $V_{EA1}$. The output signal $V_{EA1}$ is fed back through the resistor R8 and capacitor C5 to the negative input of the op amp U2 and is received as a feedback voltage. The op amp U2 receives a reference voltage $V_{ref1}$ on its positive input. The output signal $V_{EA1}$ therefore is the difference between the feedback voltage and the reference voltage. In this configuration, the op amp U2 seeks to provide an output voltage $V_{EA1}$ that maintains the value of the feedback voltage as close as possible to the value of the reference voltage $V_{ref1}$. The output voltage $V_{out}$ is provided from the feedback voltage. In particular, the output voltage $V_{out}$ is a based on the relationship of the resistors R5 and R7 according to the following equation:

$$V_{out}=[(R5+R7)/R5]*V_{ref1}$$

When the switch M1 is turned off, the magnetizing energy stored in the magnetic core 104 returns in the form of a flyback voltage. That voltage is clamped by an error signal $V_{EA}$ via diodes D6 and D8. During the flyback time, the error signal $V_{EA}$ is fed back to the primary side of the magnetic core 104 by the voltage reflected across nodes C and D which is then peak-charged into the capacitor C4 through the diode D11 to form the primary-side feedback signal V. A resistor R6 may be provided to control the discharge rate of the capacitor C4.

Figure 5:
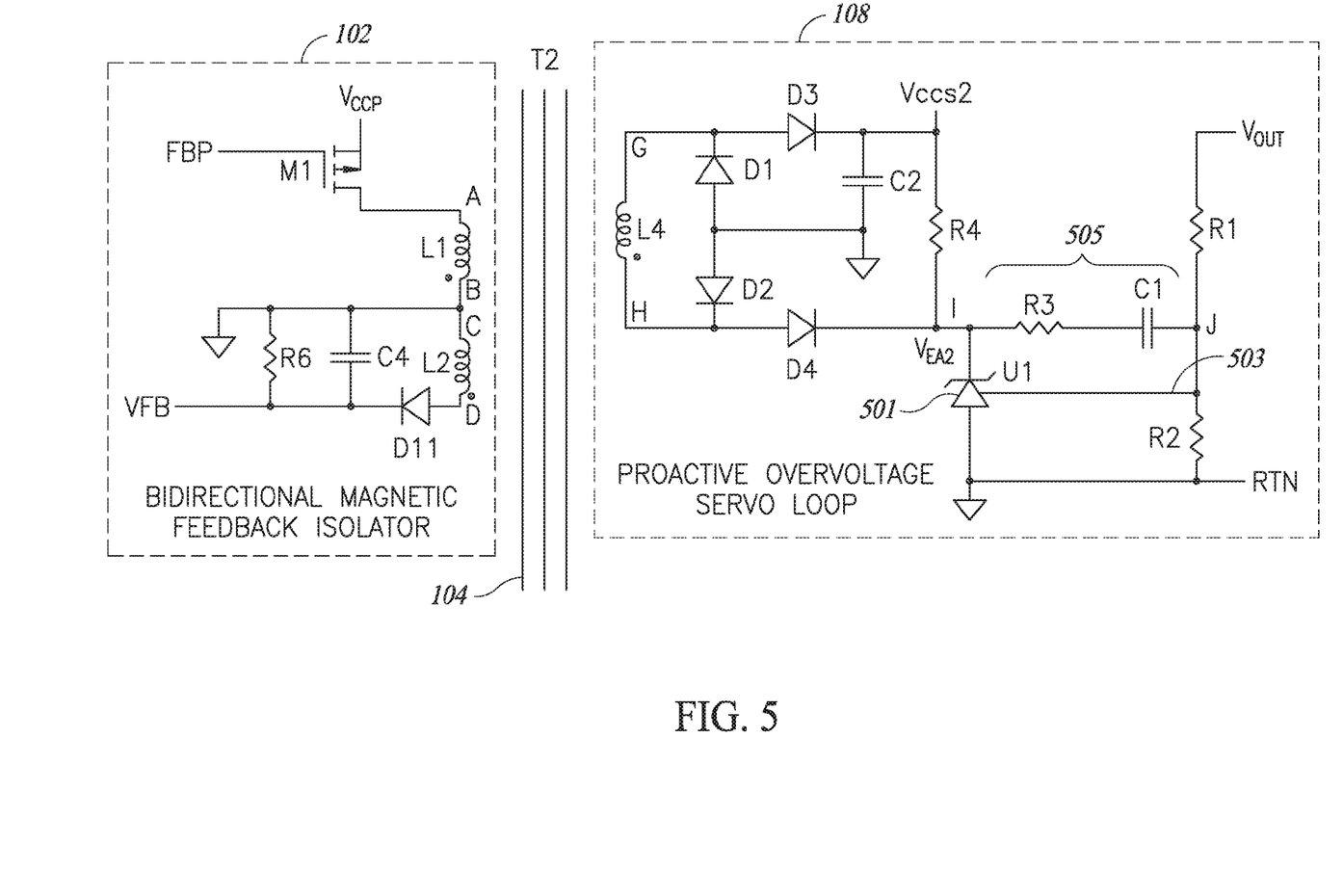
FIG. 5 is a low level circuit diagram of a bi-directional magnetic feedback isolator magnetically coupled to an over-voltage protection circuit that uses a shunt regulator, according to one illustrated implementation.

FIG. 5 is a low level circuit diagram of the primary clock and feedback control 102 magnetically coupled to an over-voltage protection circuit 108 via the magnetic core 104, according to one illustrated implementation. The magnetic core 104 has primary side windings L1 and L2 associated with the primary clock and feedback control 102 and an over-voltage winding L4 associated with the over-voltage protection circuit 108. The winding L1 is located between nodes A and B, the winding L2 is located between nodes C and D, and the over-voltage winding L4 is located between nodes G and H. The turns ratio for the windings L1, L2, and L4 may be any turns ratio suitable for a particular application, for example, 1:1:1, 1:1:2, etc. A fixed frequency pulse signal may be provided at a sampling switch control node FBP which is coupled to a gate node of a switch M1. The switch M1 may be any type of suitable switch (e.g., MOSFET, IGBT).

When the switch M1 is turned on, the winding L1 of the magnetic core 104 is coupled to a primary side voltage supply $V_{CCP}$. This causes a magnetizing energy to build up in the magnetic core 104. At this time, the voltage across nodes C and D of winding L2 is negative at the anode of a diode D11 so the diode D11 is not conducting. When the switch M1 is turned on, the $V_{CCP}$ voltage is transferred from A-B to G-H, which is then peak-charged into the capacitor C2 by diodes D2 and D3 to provide the secondary side supply voltage $V_{CCS2}$. In implementations in which the number of windings in L4 equals the number of windings in L3, the voltage $V_{CCS2}$ may approximately equal the voltage $V_{CCS1}$.

A shunt regulator is formed in the over-voltage protection circuit 108 by an integrated circuit U1, resistors R2 and R3, and a capacitor C1. A cathode of the shunt regulator is connected to node I. The integrated circuit U1 is represented in FIG. 5 as a voltage reference 501 with an external reference voltage $V_{ref}$ supplied by line 503. The integrated circuit U1 also includes an internal voltage supply that maintains an internal reference voltage. The integrated circuit U1 controls the current flow entering its cathode from Node I in order to match the external reference voltage $V_{ref}$ on reference line 503 with the internal reference voltage provided by the internal voltage supply. In some implementations, the internal reference voltage is 2.5 Volts, such as provided by the integrated circuits in the TL431 family of devices, which can be used to form a shunt regulator. A feedback connection 505 provides an electrical connection between node I at the cathode of the integrated circuit UT and node J at the reference line 503 for the integrated circuit U1. The feedback connection 505 allows the conditions at node I to be fed back through the reference line 503 to the integrated circuit U1. The capacitor C1, however, delays the transfer of the feedback from node I to node J as the capacitor C1 charges. The amount of delay experienced by the feedback connection 505 depends on the characteristics (e.g., capacitance, size and configuration of conducting plates, etc.) of the capacitor C1.

Resistor R4, placed between the secondary side voltage supply $V_{CCS2}$ and the cathode of U1, provides a pull-up voltage for node I and biasing current for the integrated circuit U1. The current and voltage provided at node I should be sufficient to activate the integrated circuit U1 as a shunt regulator. In some implementations, the voltage at node I needed to activate the integrated circuit U1 as a shunt regulator may be based, at least in part, on maintaining node J at the external reference voltage $V_{ref}$ that matches the internal reference voltage within integrated circuit U1. Accordingly, the resistance of resistor R4 may be based on the expected secondary side supply voltage $V_{CCS2}$ as well as the voltage and current requirements for integrated circuit U1.

Resistor R2 and resistor R3 enable the output voltage $V_o$ to be adjusted based on the value of $V_{ref}$. The output voltage $V_o$ is related to the reference voltage $V_{ref}$ on the reference line 503 by the following equation:

$$V_{out} = [(R1+R2)/R1] * V_{ref2} \qquad \text{Eq. 2}$$

In some implementations, the value for $V_{ref}$ is set at 2.5 Volts. Accordingly, the values of R1 and R2 can be modified according to Equation 1 to provide the desired output voltage $V_o$ for the over-voltage protection circuit 108. Moreover, because the shunt regulator can precisely control $V_{ref}$ to maintain it within a narrow band of voltage values (e.g., within 0.5%-2% of the set voltage value), the shunt regulator can likewise precisely control the output voltage $V_o$ to maintain it within a narrow band of voltages.

When the switch M1 is turned off, the magnetizing energy stored in the magnetic core 104 returns to the secondary side of the magnetic core 104 by the voltage reflected across nodes G and H. Diodes D1 and D4 direct this voltage to node I, which obtains a voltage $V_{EA2}$ that is related to the voltage of primary-side feedback signal V in the primary clock and feedback control 102. In some implementations, the voltage $V_{EA2}$ at node I during the flyback time is sufficient to engage the integrated circuit U1, and associated components, as a shunt regulator. Accordingly, as discussed above, the voltage $V_{EA2}$ should be sufficient to maintain node J at an external reference voltage $V_{ref}$ that matches the internal reference voltage within the integrated circuit U1. In this situation, as discussed above, R1 and R2 can be modified according to Equation 1 to provide the desired output voltage $V_o$ for the over-voltage protection circuit 108 during the flyback period.

Figure 6:
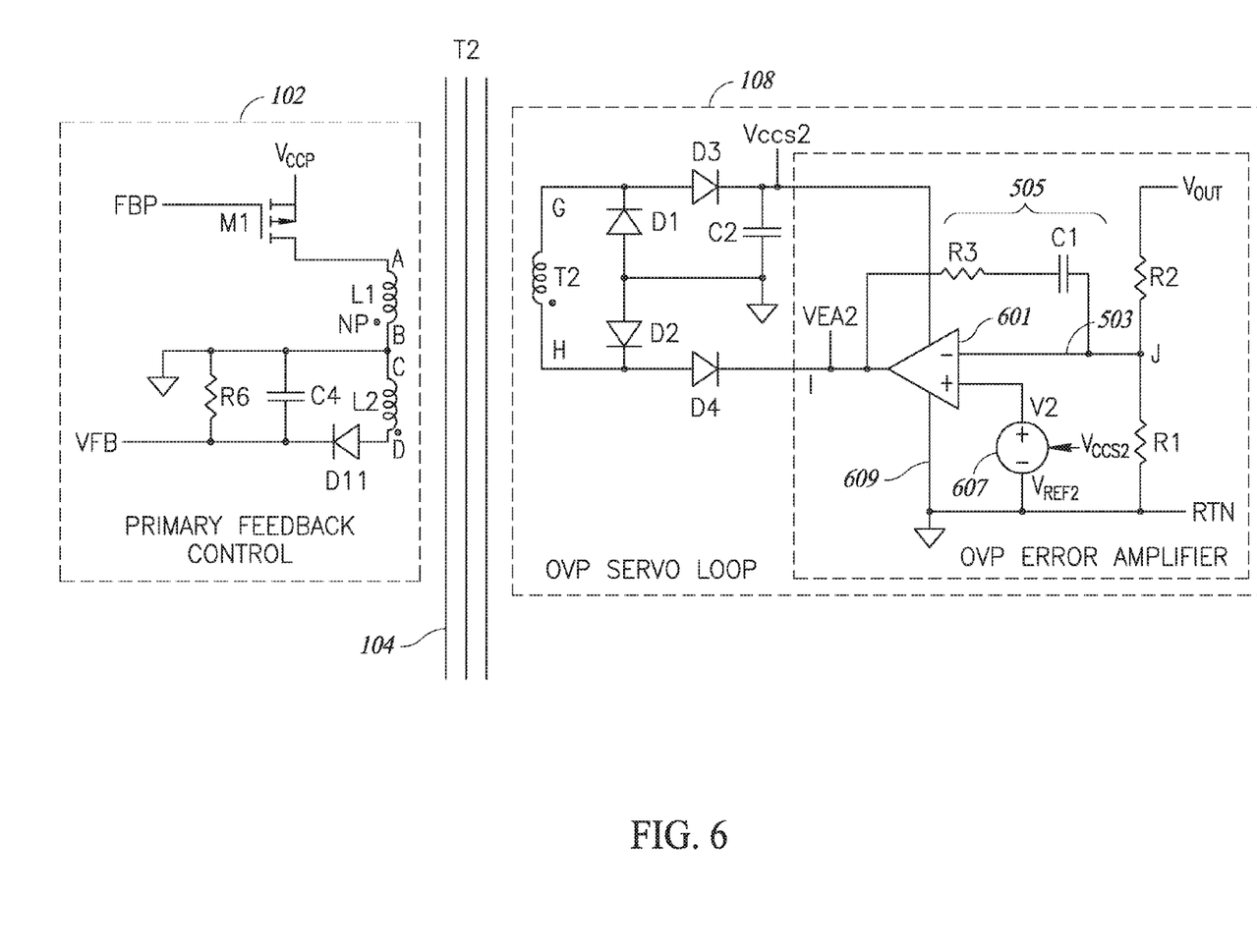
FIG. 6 is a low level circuit diagram of a protective over-voltage servo loop that uses an op amp to provide an output voltage, according to one illustrated implementation.

FIG. 6 is a low level circuit diagram of an over-voltage protection circuit that uses an op amp 601 to provide an output voltage, according to one illustrated implementation. The op amp 601, along with a voltage reference 607, replaces the integrated circuit U1 shown in FIG. 5. The op amp 601 receives the $V_{ref}$ signal from the reference line 503 and compares $V_{ref}$ to a reference voltage provided by voltage reference 607. In the negative feedback configuration shown in FIG. 6, the op amp 601 will maintain its output at node I to keep the feedback signal on line 503 is as close as possible to the reference voltage $V_{ref}$. In some implementations, for example, the voltage reference 607 may output a reference voltage of approximately 2.5 Volts. In such an implementation, the op amp 601 will try to maintain the voltage at node I such that the voltage provided by the feedback signal on line 503 is as close as possible to 2.5 Volts provided by the voltage reference 607. In this case, the value of $V_{out}$ can be determined based on the values of R1 and R2 according to Equation 2 above. Accordingly, in this implementation, the op amp 601, along with the resistors R1 and R2, can be used to precisely maintain the value for $V_{out}$ within a narrow band of voltages (e.g., within 0.5% to 2.0% of the nominal value for $V_{out}$).

The remaining components in FIG. 6 function in the same manner as the similar components in FIG. 5. Accordingly, the resistor R4 provides a pull up voltage to $V_{CCS2}$ from node H in order to provide the necessary voltage for the op amp 601. In addition, the resistor R3 and the capacitor C1 provide a feedback delay in providing the voltage $V_{ref}$ signal on the reference line 503, as previously discussed.

Figure 7:
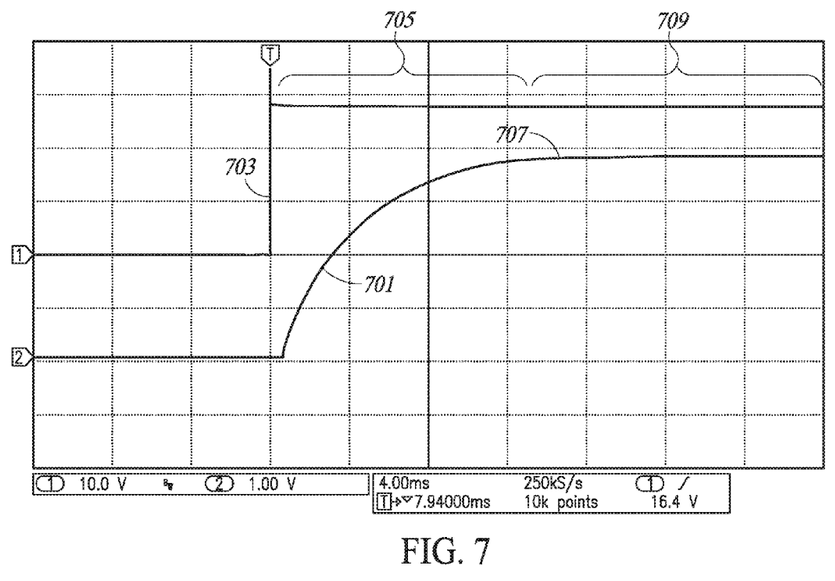
FIG. 7 is a plot that shows a voltage signal at an output voltage node of a power converter having an operational over-voltage protection circuit during a time period in which the output voltage of the main servo loop is trimmed to exceed the threshold voltage at which the operational over-voltage protection circuit is engaged, according to one illustrated implementation.

FIG. 7 is a plot that shows a voltage signal at an output node of a power converter having an over-voltage protection circuit 108 during a time period in which the output voltage of the main servo loop 106 is trimmed to exceed the threshold voltage for engaging the over-voltage protection circuit 108, according to one illustrated implementation. A signal $V_{out}$ 701 represents a voltage at an output node of the power converter as a function of time, and a signal $V_{in}$ 703 represents a step signal that is input into the power converter. The output voltage of the main servo loop is set at 4.0 Volts and the threshold or set-point for engaging the over-voltage protection circuit 108 is set at 3.8 Volts. As seen in FIG. 7, the power for signal $V_{out}$ 701 is provided by the output from the main servo loop 106 for a first time period 705. During this period, the output voltage from the main servo loop 106 is less than the 3.8 voltage threshold for engaging the over-voltage protection circuit 108. At point 707, however, the output voltage from the main servo loop 106 exceeds the 3.8 voltage threshold, at which point the power converter supplies the power for $V_{out}$ 701 from the over-voltage protection circuit 108. The power for $V_{out}$ 701 continues to come from the over-voltage protection circuit 108 for the remaining time period 709 shown in the plot for FIG. 7.

Figure 8:
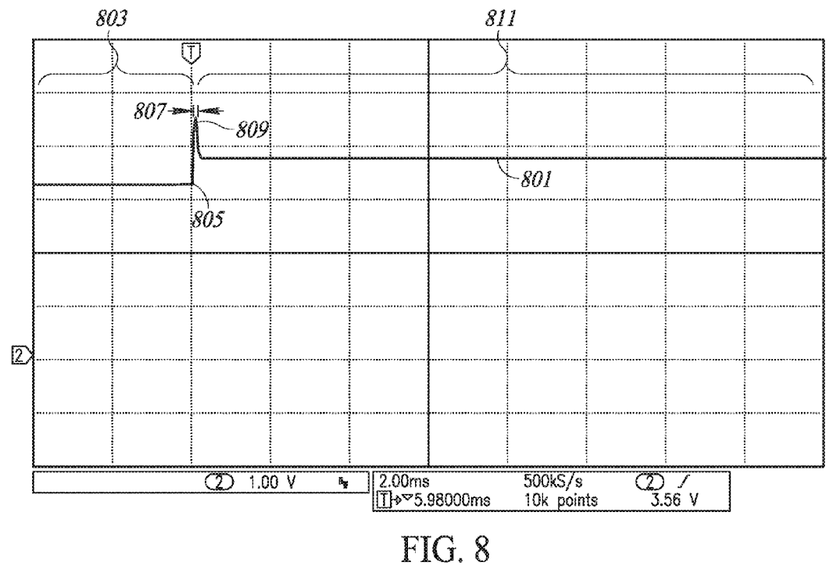
FIG. 8 is a plot that shows a voltage signal at an output voltage node of a power converter having an operational over-voltage protection circuit during a time period in which the feedback control of the main servo loop is suddenly disconnected, according to one illustrated implementation.

FIG. 8 is a plot that shows a voltage signal at an output node of a power converter having an operational over-voltage protection circuit 108 that is engaged during a time in which the feedback control of the main servo loop 106 is disconnected, according to one illustrated implementation. A signal $V_{out}$ 801 represents a voltage at an output voltage node of a power converter as a function of time. The output voltage of the main servo loop 106 is initially set at 3.3 Volts, and the threshold or set-point of the over-voltage protection circuit 108 is set at 3.8 Volts. During a first time period 803, the power for the signal $V_{out}$ 801 is provided by the main servo loop 106. At point 805, however, the feedback control of the main servo loop 106 is disconnected, resulting in the voltage output from the main servo loop 106 rapidly increasing past 3.8 Volts during a second time period 807. During this time period, the feedback impedance in the over-voltage protection circuit 108 delays the over-voltage protection circuit 108 from being engaged. At point 809, however, the power converter supplies the power for $V_{out}$ 801 from the over-voltage protection circuit 108, which continues for the remaining time period 811.

Figure 9:
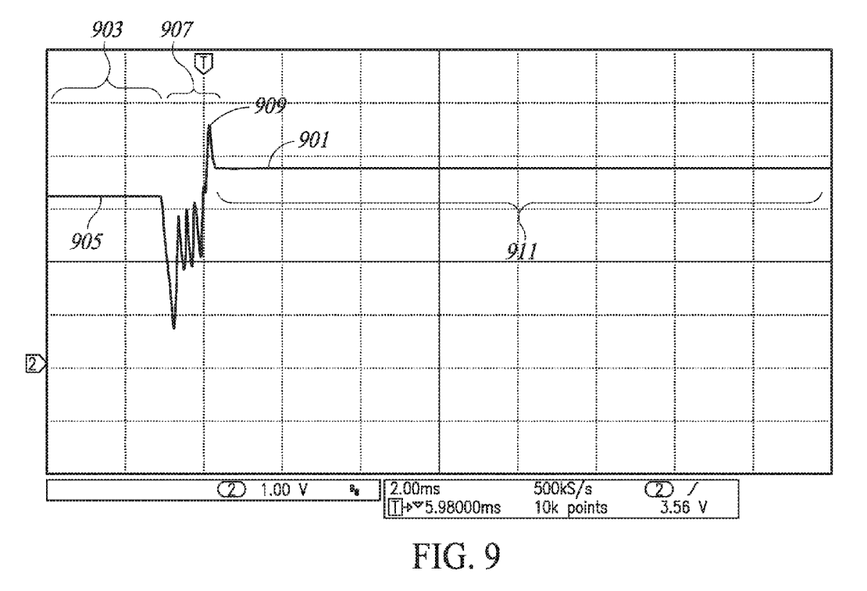
FIG. 9 is a plot that shows a voltage signal at an output voltage node of a power converter having an operational over-voltage protection circuit during a time period in which the output voltage of the main servo loop has been broken resulting in a momentary drop and then induced substantial increase in the output voltage of the main servo loop, according to one illustrated implementation.

FIG. 9 is a plot that shows a voltage signal at an output voltage node of a power converter having an operational over-voltage protection circuit 108 when the output voltage of the main servo loop 106 has been disabled, according to one illustrated implementation. A signal $V_{out}$ 901 represents a voltage at an output voltage node of a power converter as a function of time. The output voltage of the main servo loop 106 is initially set at 3.3 Volts, and the threshold or set-point of the over-voltage protection circuit 108 is set at 3.8 Volts. During a first time period 903, the main servo loop 106 functions normally, providing an output voltage of 3.3 Volts. At first point 905, the main servo loop 106 is broken, initially causing a momentary drop in voltage to less than 1.0 Volt. During a second time period 907, the output voltage from the main servo loop 106 increases until it eventually reaches and then exceeds the 3.8 Voltage threshold for engaging the over-voltage protection circuit 108. During this period, the output voltage from the main servo loop 106 continues to increase past 4.5 Volts. At point 909, the power converter engages the over-voltage protection circuit 106 to provide the power for the signal $V_{out}$ 901, at which point the signal $V_{out}$ 901 quickly falls to the 3.8 Volt output provided by the over-voltage protection circuit 108. The power for the signal $V_{out}$ 901 continues to be provided by the over-voltage protection circuit 108 for the remaining time period 911.

Figure 10:
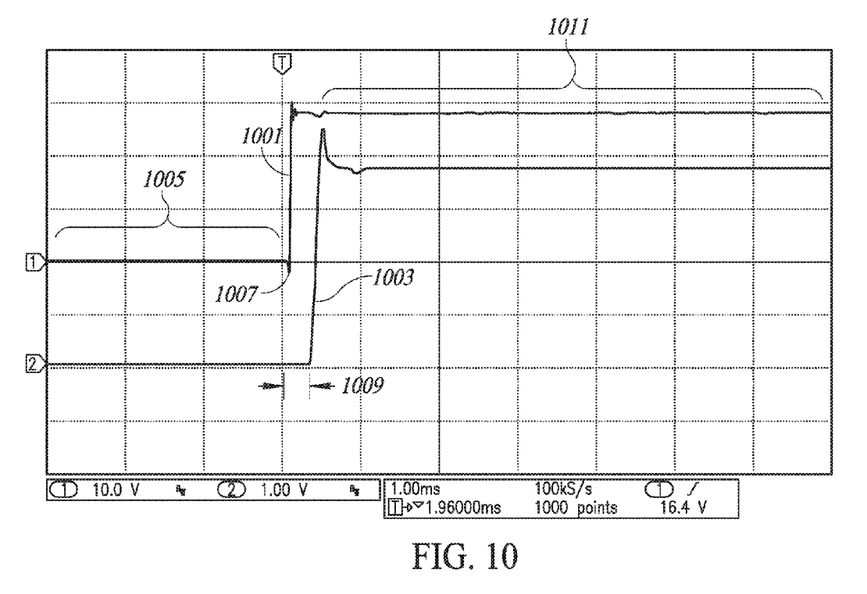
FIG. 10 is a plot that shows a voltage signal at an output voltage node of a power converter having an operational over-voltage protection circuit during a time period in which the main servo loop has been disabled prior to the converter being started up such that the over-voltage protection circuit takes control of the output voltage upon start up, according to one illustrated implementation.

FIG. 10 is a plot that shows a voltage signal at an output node of a power converter having an operational over-voltage protection circuit 108 during a time in which the main servo loop 106 has been disabled prior to the power converter being started up such that the over-voltage protection circuit 108 is engaged to provide the output voltage upon start up, according to one illustrated implementation. The signal $V_{In}$ 1001 represents an input step signal for the power converter, and signal $V_{out}$ 1003 represents the output signal from the power converter. Signal $V_{In}$ 1001 is off during the first time period 1005 and is switched on at point 1007. Because the main servo loop 106 has been disabled, the output voltage increases uncontrollably until it reaches the set-point for the over-voltage protection circuit. At that point, the power for signal $V_{out}$ 1003 is provided by the over-voltage protection circuit 108 after a delay period 1009. The over-voltage protection circuit 108, though, may have a start-up time that is faster than the start-up time for the main servo loop 106 to minimize the delay period 1009. The fast start-up time enable the over-voltage protection circuit 108 to protect from overvoltage failure that may occur even before, as well as during, operation. The over-voltage protection circuit 108 continues to provide the power for the signal $V_{out}$ 1003 for the remaining time period 1011.

Figure 11:
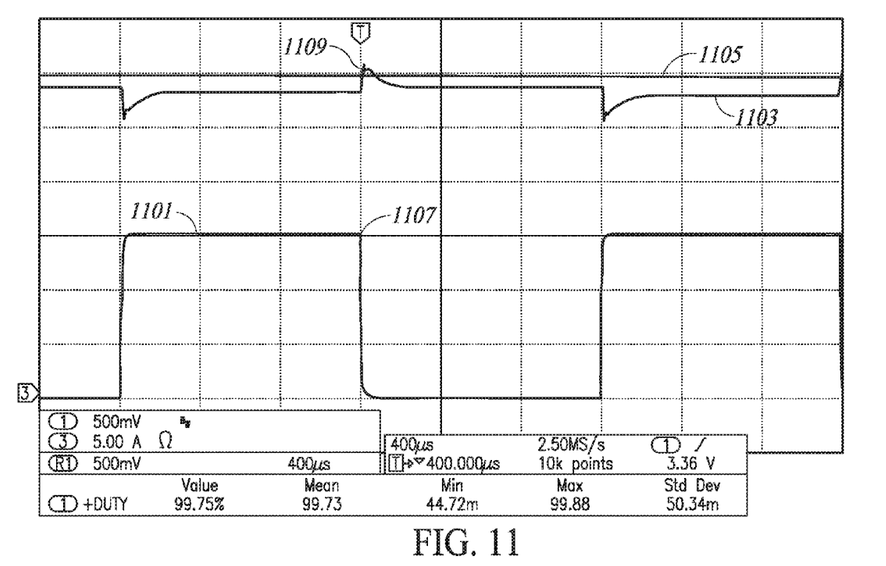
FIG. 11 is a plot that shows voltage signal at an output voltage node of a power converter having an operational over-voltage protection circuit in which the power converter does not engage the over-voltage protection circuit when the output voltage exceeds a threshold voltage due to voltage transients induced by load current stepping, according to one illustrated implementation.

FIG. 11 is a plot that shows a voltage signal at an output node of a power converter having an operational over-voltage protection circuit 108 with a threshold voltage during a time period in which the over-voltage protection circuit 108 does not interfere with the output voltage from the main servo loop 106 even during dynamic response times or periods in which the output voltage from the main servo loop 106 exceeds a threshold voltage due to voltage transients, according to one illustrated implementation. Signal $I_{out}$ 1101 represents the output load current for the power converter during a load transient from 0 Amps to 15 Amps and back to 0 Amps. The signal $V_{out}$ 1103 represents the voltage signal that is output from the power converter. The output signal $V_{out}$ 1103 for the power converter is provided by the voltage output of the main servo loop 106 during the entire time period shown in FIG. 11. The nominal voltage of the main servo loop 106, and thus the nominal voltage of $V_{out}$ 1103, is set at 3.3 Volts. Line 1105 represents the set-point or threshold of the over-voltage protection circuit 108 of 3.45 Volts. At point 1107, the output load current $I_{out}$ 1101 transitions from 0 Amps to 15 Amps. This transition causes a voltage transient 1109 to occur in the output signal of the main servo loop 106 in which the output voltage from the main servo loop 106 momentarily exceeds the 3.45 Volt threshold 1105 of the over-voltage protection circuit 108 during a dynamic response time or period. As seen in FIG. 11, the voltage transient 1109 exceeds the 3.45 Volt threshold 1105 for about 400 μs. Because of the delay provided by the feedback impedance in the over-voltage protection circuit 108, the power converter does not engage the over-voltage protection circuit 108 to provide the output voltage signal $V_{1203}$.

Figure 12:
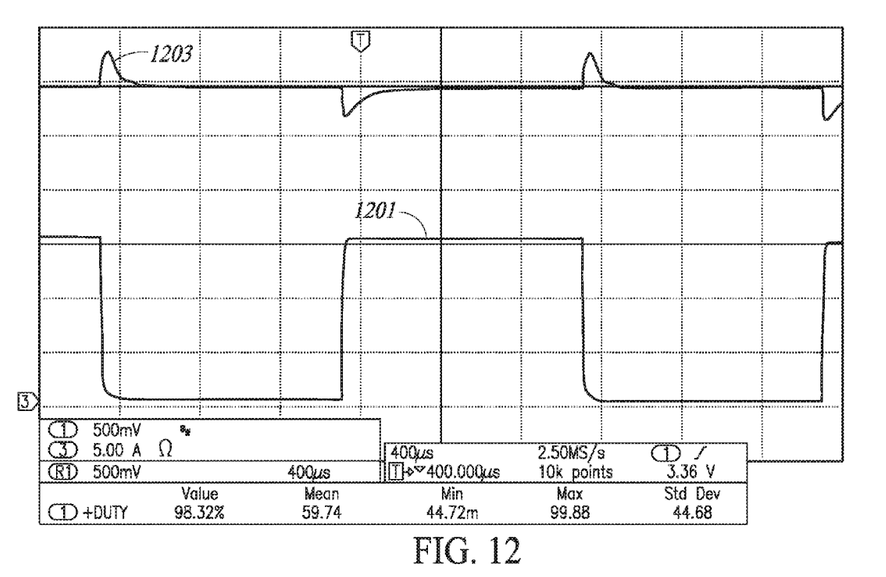
FIG. 12 is a plot that shows an output voltage node of a power converter having an operational over-voltage protection circuit with a threshold voltage set to within 5% of the nominal output voltage of the main servo loop during a time period in which the output voltage of the main servo loop is trimmed to exceed a threshold voltage or lost control inducing the output voltage to run away, according to one illustrated implementation.

FIG. 12 is a plot that shows a voltage signal at an output node of a power converter having an operational over-voltage protection circuit 108 with a threshold voltage set to within 5% of the nominal output voltage of the main servo loop, at a time in which the output voltage of the main servo loop 106 is trimmed to exceed the threshold voltage, according to one illustrated implementation. Signal $I_{out}$ 1201 represents a square wave output load current for the power converter, and signal $V_{out}$ 1203 represents the voltage signal that is output from the power converter. The nominal voltage for the signal output by the main servo loop 106 has been trimmed to 4.0 Volts, whereas the set-point or threshold for engaging the over-voltage protection circuit 108 has been set at 3.45 Volts. According, the output signal $V_{out}$ 1203 for the power converter is provided by the voltage output of the over-voltage protection circuit 108 during the entire time period shown in FIG. 12.

The foregoing detailed description has set forth various implementations of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof.

Those of skill in the art will recognize that many of the methods or algorithms set out herein may employ additional acts, may omit some acts, and/or may execute acts in a different order than specified.

The various implementations described above can be combined to provide further implementations. The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, if any, including but not limited to U.S. Pat. No. 8,710,820, titled "SWITCHED CAPACITOR HOLD-UP SCHEME FOR CONSTANT BOOST OUTPUT VOLTAGE," issued Apr. 29, 2014; U.S. Pat. No. 9,419,538, titled "AC/DC POWER CONVERSION SYSTEM AND METHOD OF MANUFACTURE OF SAME," issued Aug. 16, 2016; U.S. patent application Ser. No. 13/185,142, titled "POWER CONVERTER APPARATUS AND METHOD WITH COMPENSATION FOR LIGHT LOAD CONDITIONS," filed Jul. 18, 2011; U.S. Pat. No. 8,824,167, titled "SELF SYNCHRONIZING POWER CONVERTER APPARATUS AND METHOD SUITABLE FOR AUXILIARY BIAS FOR DYNAMIC LOAD APPLICATIONS," issued Sep. 2, 2014; U.S. Pat. No. 8,885,308, titled "INPUT CONTROL APPARATUS AND METHOD WITH INRUSH CURRENT, UNDER AND OVER VOLTAGE HANDLING," issued Nov. 11, 2014; U.S. Pat. No. 8,829,868, titled "POWER CONVERTER APPARATUS AND METHOD WITH OUTPUT CURRENT SENSING AND COMPENSATION FOR CURRENT LIMIT/CURRENT SHARE OPERATION," issued Sep. 9, 2014; U.S. Pat. No. 8,890,630, titled "OSCILLATOR APPARATUS AND METHOD WITH WIDE ADJUSTABLE FREQUENCY RANGE," issued Nov. 18, 2014; U.S. Provisional Patent Application Ser. No. 61/547,327, titled "OUTPUT FILTER FOR USE WITH POWER CONVERTERS, FOR EXAMPLE DC/DC POWER CONVERTERS, FOR INSTANCE INTERPOINT MFP POL DC/DC POWER CONVERTERS," filed Oct. 14, 2011; U.S. Pat. No. 8,866,551, titled "IMPEDANCE COMPENSATION FOR OPERATIONAL AMPLIFIERS USED IN VARIABLE ENVIRONMENTS," issued Oct. 21, 2014; U.S. Pat. No. 9,041,378, titled "DYNAMIC MANEUVERING CONFIGURATION FOR MULTIPLE CONTROL MODES IN A UNIFIED SERVO SYSTEM," issued May 26, 2015; U.S. patent application Ser. No. 14/787,565, titled "DYNAMIC MANEUVERING CONFIGURATION FOR MULTIPLE CONTROL MODES IN A UNIFIED SERVO SYSTEM," filed Oct. 28, 2015; U.S. Pat. No. 9,230,726, titled "TRANSFORMER-BASED POWER CONVERTERS WITH 3D PRINTED MICROCHANNEL HEAT SINK," issued Jan. 5, 2016; U.S. Pat. No. 9,160,228, titled "INTEGRATED TRI-STATE ELECTROMAGNETIC INTERFERENCE FILTER AND LINE CONDITIONING MODULE," issued Oct. 13, 2015; U.S. Pat. No. 9,293,999, titled "AUTOMATIC ENHANCED SELF-DRIVEN SYNCHRONOUS RECTIFICATION FOR POWER CONVERTERS," issued Mar. 22, 2016; U.S. patent application Ser. No. 15/178,968, titled "DYNAMIC SHARING AVERAGE CURRENT MODE CONTROL FOR ACTIVE-RESET AND SELF-DRIVEN SYNCHRONOUS RECTIFICATION FOR POWER CONVERTERS," filed Jun. 10, 2016, are incorporated herein by reference, in their entirety. Aspects of the embodiments can be modified, if necessary, to employ concepts of the various patents, applications and publications to provide yet further embodiments. These and other changes can be made to the implementations in light of the above-detailed description.

In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A method for providing over-voltage protection for a transformer using an over-voltage protection loop, the transformer to include a primary clock and feedback control circuit, a main servo loop circuit, and the over-voltage protection loop, the method comprising:

provideing a secondary side voltage by activating an over-voltage winding, the over-voltage winding being activated in response to a voltage on a primary winding in the primary clock and feedback control circuit;

using the secondary side voltage to maintain a voltage on a first node of an error amplifier, the error amplifier being electrically coupled to a first node and a second node, wherein the voltage on the first node is maintained according to an internal reference voltage of the error amplifier;

introducing a time delay to a feedback signal transmitted from the second node to the first node through a feedback impedance, the feedback impedance being electrically coupled between the first node and the second node; and controlling an output voltage at an output node based on the voltage at the first node using an output voltage sensing circuit electrically coupled to at least the first node and the output node, wherein the over-voltage protection loop provides the output voltage for the transformer under an error condition.

* * * * *